Nov. 25, 1969  E. B. BAHMSEN  3,479,746
CONTINUOUS DRYING METHOD AND APPARATUS
Original Filed Oct. 21, 1965
2 Sheets-Sheet 1
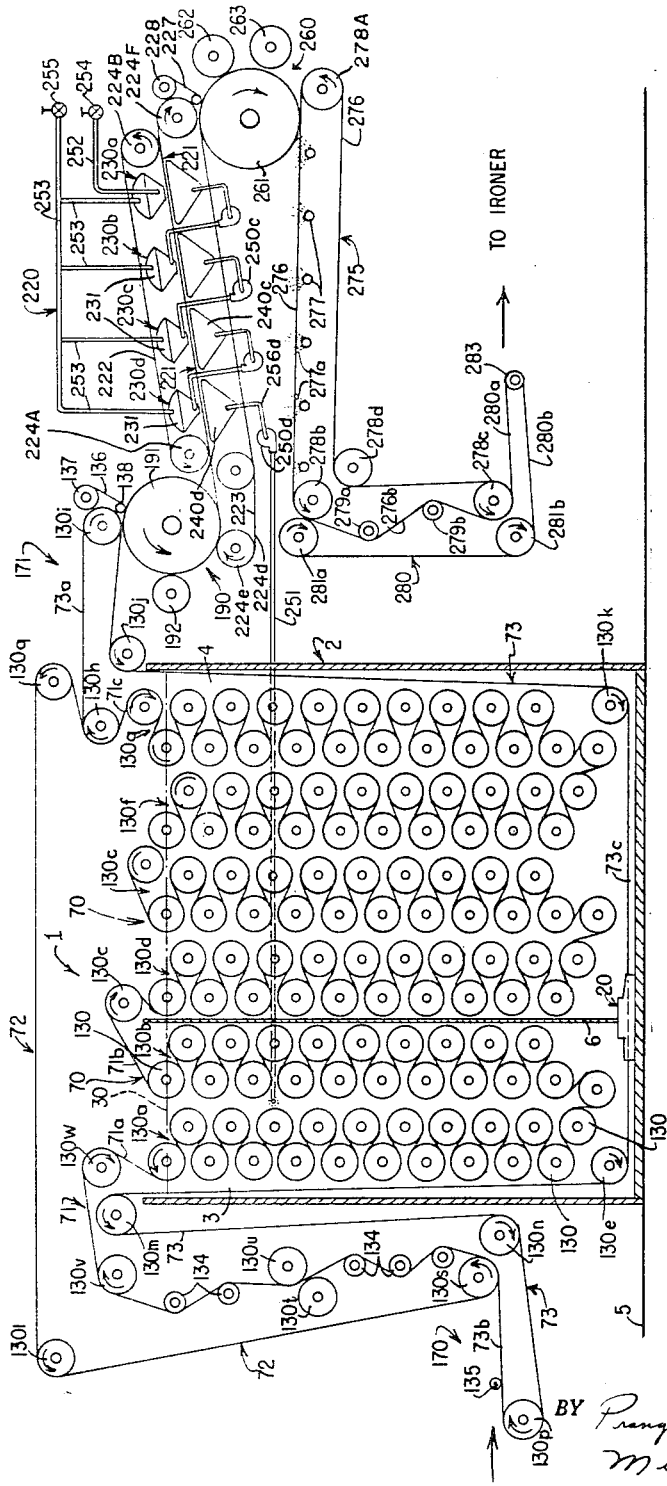
FIG. I
INVENTOR.
Erwin B. Bahmsen
BY Prangley, Baird, Clayton, Miller & Vogel
Attys.

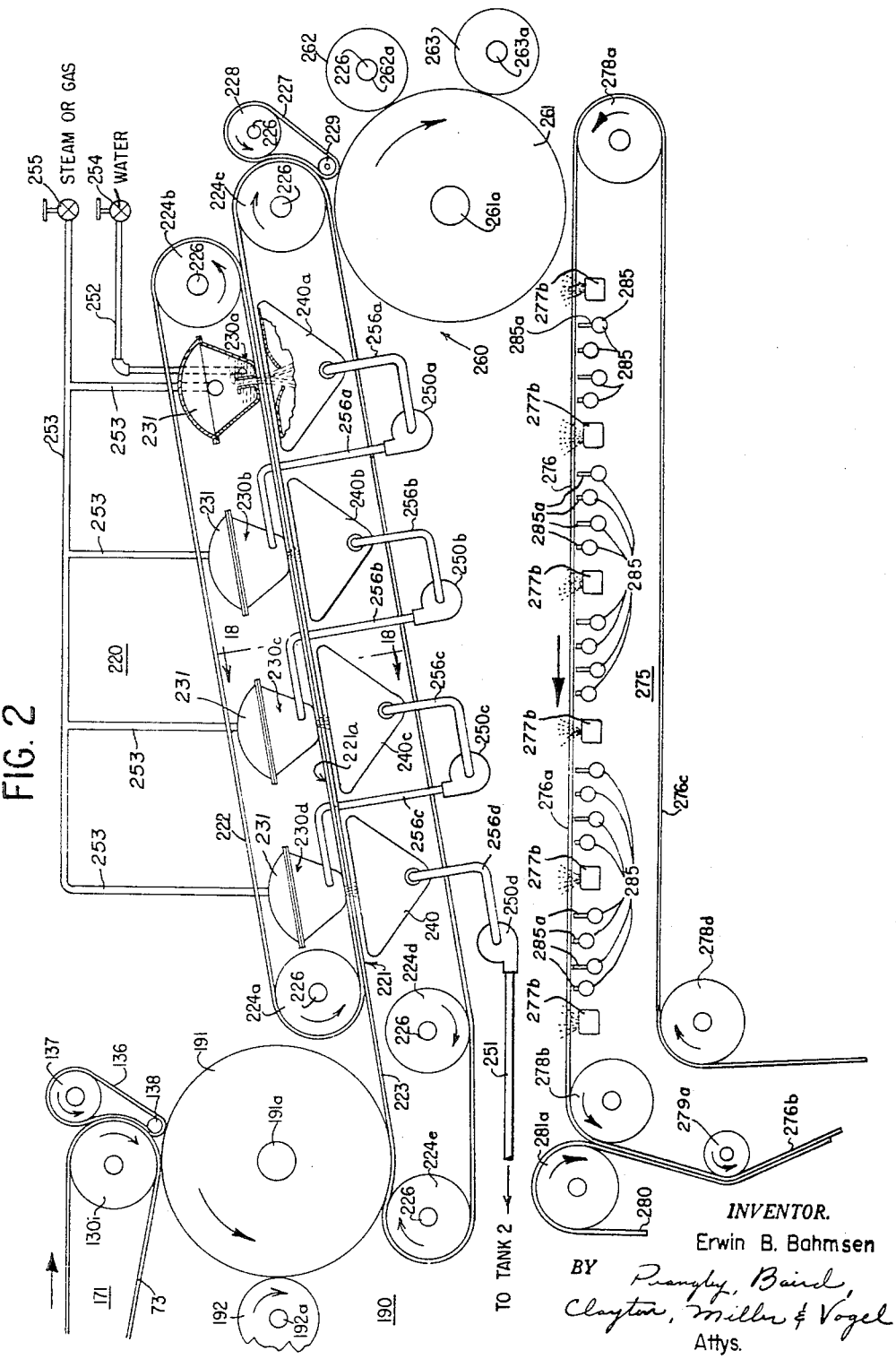

United States Patent Office 3,479,746
Patented Nov. 25, 1969

3,479,746
CONTINUOUS DRYING METHOD AND APPARATUS
Erwin B. Bahmsen, Hinsdale, Ill., assignor to Steiner American Corporation, Salt Lake City, Utah, a corporation of Nevada
Original application Oct. 21, 1965, Ser. No. 499,137. Divided and this application July 19, 1968, Ser. No. 754,149
Int. Cl. F26b *13/06, 3/30*
U.S. Cl. 34—17
15 Claims

ABSTRACT OF THE DISCLOSURE

A method and an apparatus for drying solid fabric articles, wherein the articles are dried by subjecting them successively to radiant heat and blasts of warm air while the articles are transported along a horizontal path.

---

This application is a division of the co-pending application for United States Letters Patent Ser. No. 499,137, filed Oct. 21, 1965, now Patent No. 3,439,365, by Erwin B. Bahnsen for Continuous Washing Method and Apparatus.

This invention pertain to methods and apparatus for drying pliant materials. The method and apparatus of this invention are useful in commercial laundries for washing flatwork, and are applicable especially for automatic, high speed, economical washing of rolled towels and other elongated, flexible fabric articles.

The objects of this invention include the provision of:

(1) An automatic, high-speed, economical, continuous-duty drying method and system;

(2) A continuous drying method and apparatus wherein articles containing rinse fluid are transported along a predetermined path, subjecting the articles to a source of radiant heat during transportation thereof along the predetermined path, and subjecting the articles to a blast of hot air directed onto the articles during transportation thereof along the predetermined path;

(3) A continuous drying method and apparatus of the type set forth wherein the blast of hot air is directed at a point on the predetermined path immediately adjacent to the source of radiant heat and on the side thereof in the direction of travel of the articles along the predetermined path;

(4) A continuous drying method and apparatus, wherein the source of radiant heat is a gas-fired infrared burner, and the air has a temperature of about 150° F.;

(5) A continuous drying method and apparatus of the type set forth, wherein the predetermined path is essentially horizontal and the source of radiant heat is disposed below the path and directed upwardly onto the articles transported therealong and the blast of hot air is directed upwardly onto the articles transported therealong;

(6) A continuous drying method and apparatus of the type set forth wherein a plurality of spaced-apart sources of radiant heat is utilized and a plurality of successive blasts of hot air corresponding in number to the sources of radiant heat is utilized; and (7) An automatic, continuous-duty drying system characterized by markedly greater speed, drying effectiveness, economy of operation, and gentleness of work processing than could be obtained through utilization of the methods and apparatus of the prior art.

The foregoing paragraphs are intended to summarize and explain the significance of this invention in relation to the problems which it resolves, and should not be construed to narrow the scope of protection delimited by the claims set forth hereinafter. For a more complete understanding of the procedures, structure, operation, and novel features of the method and apparatus of this invention, reference is made to the following description and the drawings, wherein:

FIG. 1 represents diagrammatically a longitudinal cross section through the feeder, washer, detergent wringer, rinser, water wringer, and dryer stages of a washing system in accordance with the apparatus and method of this invention; and FIG. 2 is an enlarged diagram in partial cross section of the front side elevation of the soap wringer, rinsing, water wringer, and dryer stages of the washing system incorpating this invention.

The washing system

As represented in FIG. 1, a continuous-duty, automatic washing system incorporating therein a novel drying method and apparatus in accordance with this invention generally comprises a washer stage 1 wherein the work is sandwiched between endless belts of a conveyor 71 and carried through the washing solutions of tank 2 while being subjected simultaneously to an orbital motion provided by a conveyor transport mechanism 70, and a roller-type detergent wringer stage 190 disposed beneath the discharge end of the conveyor 71 for expressing washing solution from the work emerging from the tank 2. A rinser stage 220 provided with an endless belt belt conveyor 221 is disposed in cooperative relation with the wringer stage 190 for receiving and carrying the work from the wringer stage 190 successively beneath each of four rinsing units 230a, 230b, 230c, and 230d, wherein the same rinse solution supplied via a pipe 252, and moving in a counterflow direction, is mixed in each unit with superheated steam or air or other gas supplied through pipes 253 and is then forced under pressure through the work. A roller-type rinse wringer stage 260 is disposed at the discharge end of the rinse conveyor 221 for expressing rinse solution from the work leaving the rinser stage 220, and a dryer stage 275 having an endless belt conveyor 276 is disposed in cooperative relation with the rinse wringer stage 260 for receiving and carrying the work past suitable drying means which, for simplicity, is shown in FIG. 1 to be gas flames emanating from a plurality of burners 277.

In one embodiment of this invention it was found that the speed and effectiveness of disassociation was sufficient to enable heavily-soiled flatwork to be cleaned satisfactorily while traveling for only three minutes through the tank 2 along a conveyor path 240 feet in length. This extraordinary cleansing action appears to be attributable principally to an orbital motion imparted to the immersed portion of the conveyor transport mechanism 70 in a manner to be described below. As a result of the forward movement of the conveyor 71 and the orbital motion of the immersed portion of the transport mechanism 70, each elemental portion of the conveyor 71, and the work carried thereby, moves along a cycloidal path while traveling through the tank 2. As a consequence of this motion, elemental portions of the work are in continuous appulsive-reactive interaction with the surrounding cleansing solutions. It is this continuous interaction between the work and the fluid washing solutions which effects the remarkably rapid and thorough disassociation of the dirt.

Substantially all of the cleansing solution and suspended dirt remaining in the flatwork is diluted and displaced as a result of the economical, rapid, and effective rinsing action occurring in the novel rinser stage 220. In the rinser stage 220, the rinse solution supplied to the rinsing unit 230d is collected and then pumped into the rinsing unit 230c where it is again heated and forced through the work by superheated steam, or air or other gas, supplied through the pipes 253 from a source (not shown).

In this manner, the same rinse solution also is reused successively in the rinsing units 230b and 230a. From the latter unit, the rinse solution is collected and conducted to the tank 2 where it replenishes liquid lost at the detergent wringer stage 190. Because the same rinse solution is conducted in a counterflow direction and is heated and mixed with superheated steam or hot air or other gas prior to expulsion through the work beneath each of the four rinsing units 230a to 230d, a considerable reduction in the required amount of rinse solution per unit of time is effected. For example, only 50 gallons of rinse solution per minute would be required for excellent rinsing action across work having a transverse dimension of ten feet. This means that the consumption of rinse solution may be about 1.55 gallons to 1.75 gallons per pound of dry fabric, as compared to an average consumption of about 3.5 gallons per pound required by conventional rinse systems. Hence, the rinser stage 220 not only rinses rapidly and efficiently, but with less consumption of rinse solution than has been required heretofore by conventional washing systems.

Washer stage

The washer stage 1, illustrated schematically in FIG. 1, is made up of the endless belt conveyor 71, the tank 2, and the conveyor transport mechanism 70 including a series of rollers 130 and 130a to 130w, roller drive mechanism described hereinafter in detail and illustrated in FIG. 19, an orbital support frame 80 which supports roller support brackets 90 to 93 mounting the rollers 130 in the tank 12, and an orbital drive mechanism 146 for imparting the aforedescribed orbital motion to the roller support brackets 90 to 93 and thus to those rollers 130 carried thereby. The conveyor 71 includes a feeder section 170 for receiving dry work manually or otherwise fed into the washing system, a laminar portion 71a for transporting the work along a sinuous path via groups of the rollers 130 immersed in a first compartment 3 and a second compartment 4 of the tank 2, and a discharge section 171 for carrying the work into the detergent wringer stage 190.

The conveyor 71 includes upper and lower open-mesh, flat, endless belts 72 and 73, respectively, made of stainless steel, molded nylon, or other non-corrosive materials characterized by high tensile strength and durability. One type of foraminous belting suitable for use in fabricating the upper and lower endless belts 72 and 73 is represented best in FIGS. 21 and 22. As shown in these figures, a suitable mesh belt is made of a plurality of sections 74, each section 74 having a straight end 75, inwardly inclined sides 76, and a series of zig-zag loops 77 having one set of colinear apexes 77a in linking relation with its own straight end 75 and another set of apexes 77b in linking and pivotal relation with the straight end of the next adjacent section 74. A mesh formed in this manner and having about eight apertures per lineal and transverse foot has been found to provide sufficient support and openings of adequate size for optimum appulsive-reactive interaction between the work and the cleansing solutions. A reduction in the size of the openings attenuates the interaction and yields less satisfactory washing results.

As represented in FIG. 1, the upper and lower belts 72 and 73 converge to form the laminar portion 71a of the conveyor 71 which is carried on the rollers 130 through a cleansing solution 30 contained in the tank 2. A chain and sprocket driving mechanism, to be described below, drives the upper belt 72 in a general counterclockwise direction, and the lower belt 73 in a general clockwise direction. Hence, the sections of the belts 72 and 73 forming the laminar portion 71a of the conveyor 71 move together and in the same direction through the tank 2. Concurrently with linear movement of the belts 72 and 73, thhe orbital drive mechanism 146 (hereinafter described), imparts orbital motion to the rollers 130 within the tank 2. Consequently, as will be seen, each element of the laminar portion 71a of the conveyor 71 moves along a cycloidal path through the solution 30. It is this motion which produces the appulsive-reactive interaction between the flatwork designated by the numeral 19 and the cleansing solution 30 required to achieve the extraordinary speed and washing results made possible by the method and apparatus of this invention.

The movement of the laminar portion 71a of the conveyor 71 through the tank 2 is along a sinuous path down and around the outer peripheries of the rollers 130 in a first vertical tier or festoon 130a of the rollers 130, up and around the rollers of a second tier 130b, both of the tiers 130a and 130b being in the first compartment 3 of the tank 2, thence over a drive roller 130c and down a tier 130d, up a tier 130e, down a tier 130f, up a final tier 130g, and thence out of the tank 2 over a drive roller 130h. FIG. 20 illustrates schematically, on an enlarged scale, how the two belts 72 and 73 move in the sinuous path down a representative tier of the rollers 130 with the flatwork 19 disposed between the belts 72 and 73. To minimize stress in the laminal portion 71a, all of the rollers of the tiers 130a, 130b, 130d, 130e, 130f and 130g are driven synchronously by a chain and sprocket roller drive mechanism 155 to be hereinafter described. From the drive roller 130h, the lower belt 73 diverges from upper belt 72 and enters the discharge section 171 of the conveyor 71. In the discharge section 171, the lower belt 73 moves along a short horizontal flight 73a and then around a feeder roller 130i of the detergent wringer stage 190. From this point the lower belt 73 is carried via idler rollers 130j, 130k, 130l and 130m along a return flight running adjacent to the inner surfaces of the ends and bottom of the tank 2, and then via an idler roller 130n back to the feeder section 170 of the system beginning at a roller 130p.

Upon leaving the drive roller 130h, the upper belt 72 diverges from the lower belt 73. This frees the flatwork emerging from the tank 2, leaving it lying in position on the surface of the horizontal flight 73a for passage through the discharge section 171 and entry into the detergent wringer stage 190. After divering from the lower belt 73, the upper belt 72 begins its return flight to the feeder section 170 via an idler roller 130q and a drive roller 130r.

The staggered arrangement of the rollers 130 in the tank 2 advantageously lengthens the path of travel of the conveyor 71 through the cleansing solutions while maintaining the belts 72 and 73 pressed together tightly enough to hold the interjacent work 19 firmly in position, a requirement for translation of the orbital motion of the rollers 130 into efficient appulsive-reactive between the work and the cleansing solutions. Furthermore, the relationship of the lengths of drive chain corresponding, respectively, to the length of the flight between two drive rollers 130v and 130w, and the length of flight between the drive roller 130h and the idler roller 130q, are adjusted to insure that enough slock exists in these short flights of the conveyor 71 to enable orbital motion of the rollers 130h and 130w along with their adjacent tiers of rollers 130, without producing harmful stresses in the belts 72 and 73.

The feeder section 170 of the system includes a short horizontal flight 73b of the lower belt 73 supported at a convenient working level above a floor 5 and extending between the roller 130p and the point of convergence of the lower belt 73 with the return flight of the upper belt 72 at a roller 130s. The flatwork 19 is, of course, fed into the systems by feeding the flatwork onto the horizontal flight 73b, where it is carried to the idler roller 130s where the two belts 72 and 73 converge and, thus, thereafter hold the flatwork therebetween. From the roller 130s, the conveyor 71 follows a vertical flight leading into the tank 2. A drive roller 130t and a guide roller 130u are located in positions which will relieve the belts 72 and 73 from much of the strain of supporting their own weight during the upward flight, and a series of guide rollers 134, supported in spaced-apart and staggered relation, bear against opposite external surfaces of the belts 72 and 73, thereby pressing them firmly together to preserve their laminar relation and preventing the flatwork sandwich between them from tending to slip out of position. The drive rollers 130v and 130w support the conveyor 71 in a short aerial flight over the forward edge of the tank 2 and into its downward path along the first vertical tier of rollers 130a.

An auxiliary roller 135 may bear against the upper surface of the short horizontal flight 73b at the feed section 170 of the system to preserve the prearranged and flattened position of the flatwork 19 during its brief trip along the horizontal flight 73b to the roller 130s, where the upper belt 72 converges upon both the work and the lower belt 73. To facilitate manual positioning and smoothing of the work in preparation for feeding it into the conveyor 71, an apron (not shown) may be disposed adjacent to the roller 130p of the feeder section 170.

The discharge section 171 of the conveyor 71 includes the short horizontal flight 73a of the lower belt 73, the feeder roller 130i, and a guide belt 136 supported, in contiguous relation with the portion of the lower belt 73 around the feeder roller 130i, by rollers 137 and 138. Hence, the flatwork 19 transported on the short horizontal flight 73b comes into interjacent relation with the guide belt 136 and the belt 73 and remains there while being carried around the feeder roller 130i to the surface of a rotatable drum 191 of the detergent wringer stage 190.

The rectangular tank 2 is divided into the first compartment 3 and the second compartment 4 by a transverse partition 6. The first compartment 3 preferably contains an alkaline solution for disintegrating and loosening dirt on and in the flatwork 19, and the second compartment 4 preferably contains a detergent-bleach solution for effecting disassociation of the dirt from the work 19. Although the dry work 19 entering the compartment 3 becomes saturated and carries some of the alkaline solution into the compartment 4, substantially an equal amount of liquid is carried out of the compartment 4 as the work emerges from the tank 2 and enters the detergent wringer stage 190. Hence, the transmission of fluid from the compartment 3 into the compartment 4 does not cause the latter to overflow. Furthermore, the orbital motion imparted to the rollers 130 shakes excess fluid from the conveyor 71 and from the work 19 carried thereby while it is traversing an aerial flight 71b in moving from the compartment 3 to the compartment 4, and while traversing an aerial flight 71c in moving from the compartment 4 to the detergent wringer stage 190. Moreover, the relatively small amount of alkaline solution added to the compartment 4 has virtually no effect on the cleansing efficacy of the detergent-bleach solution contained therein.

The fluid removed from the compartment 3 by absorption in and adsorption on and entrainment with the work 19 is replenished by the rinse effluent from the rinser stage 220 through a pipe 251. Inasmuch as the volume of the rinse effluent exceeds the amount of alkaline solution absorbed in and absorbed on and entrained with the work 19 leaving the compartment 3, this latter compartment is provided with an overflow pipe (not shown). Furthermore, the tank 2 may be equipped with conventional devices (not shown) for adding alkali, detergent and bleach, as desired, while the washing system is in operation. Alternatively, these supplies may be added manually.

Detergent and rinse wringers

The detergent-wringer stage 190 and the rinse wringer stage 260 are similar in function and essential structure. Their function is to express as much fluid as possible from the work 19. In the case of the detergent-wringer stage 190, latent detergent-bleach present in the work 19 emerging from the compartment 4 of the tank 2 is expressed, and in the case of the rinse-wringer stage 260, latent rinse effluent present in the work 19 emerging from the rinser stage 220 is expressed.

As represented in FIG. 2, the detergent-wringer stage 190 comprises the previously mentioned carrier drum 191 mounted for counterclockwise rotation on a shaft 191a, and a pressure roller 192 resiliently mounted in contact with the drum 191 for clockwise rotation around a shaft 192a. Hence, work emerging from the washer stage becomes sandwiched between the lower belt 73 and the guide belt 136. Thereafter, it is conducted clockwise through an arc of about 180 degrees around the feeder roller 130i and deposited on the surface of the carrier drum 191. The rotation of the carrier drum 191 transports the work to the point where it is engaged by a pressure roller 192 which exerts sufficient pressure to squeeze out a large percentage of the detergent-bleach solution. The detergent-bleach solution expressed from the work by the detergent wringer stage 190 flows away via any suitable drain (not shown).

After passing between the drum 191 and the pressure roller 192, the work is deposited on a lower belt 223 of the rinser conveyor 221 for transportation through the rinser stage 220.

The rinse wringer stage 260 is similar in function and essential structure to the detergent wringer stage 190. The rinse wringer stage 260 expresses a large percentage of the rinse solution from the work 19 emerging from the rinser stage 220.

Like the detergent wringer stage 190, the rinse wringer stage 260 is of the pressure-roller type. It is made up of a carrier drum 261 mounted for rotation around a shaft 261a, and two pressure rollers 262 and 263 resiliently mounted in rolling contact with the surface of the drum 261 on shafts 262a and 263a, respectively. Hence, work 19 emerging from the rinser stage 220 is deposited automatically on the surface of the drum 261 for transportation between the drum 261 and the pressure rollers 262 and 263. The pressure applied by the rollers 262 and 263 squeezes a large percentage of the rinse solution from the work 19. The solution expressed in this manner flows away through a suitable drain (not shown).

After passsing through the rinse wringer stages 260, the work is deposited automatically on the conveyor 276 of the dryer stage 275.

The rinser

In the rinser stage 220, the detergent-bleach solution remaining in the work 19 upon its emergence from the detergent wringer stage 190 effectively is washed away by a mist of water and superheated steam or other gas or air continuously forced through the work 19 from a plurality of elongated nozzles transversely disposed above and in effective contact with the work 19 as it is carried beneath them on a conveyor. In accordance with this invention, economy of operation and superior rinsing effectiveness are achieved notwithstanding the fact that the rinse water and steam or air of other gas flow continuously. As explained below in greater detail, this improved economy and rinsing action are attributable both to the use of a steam-water or air-water or gas-water mist forcefully expelled from a plurality of nozzles effectively in contact with the work 19 passing beneath their openings, and to successive reuse of the rinse effluent by conducting it in a countercurrent direction from the last through each nozzle to the first of the series.

As represented best in FIG. 2, the rinser stage 220 is comprised generally of the rinser conveyor 221, four "knife" rinsing units 230a, 230b, 230c and 230d for forming and discharging the water-steam or water-air or water-gas mist through the work 19 carried by the rinser conveyor 221, four vessels 240a, 240b, 240c and 240d for collecting the rinse effluent from each of the four units, and four force pumps 250a, 250b, 250c and 250d for forcing the effluent in a countercurrent direction from one vessel to the next in each successive rinsing unit and from the vessel 240d to the compartment 3 of the tank 2 (FIG. 1) via the pipe 251. Water from a water source (not shown) is supplied to the rinsing unit 230a via the pipe 252 and superheated steam or air or other inert gas provided through the pipes 253, is added to the rinse solution in each of the rinsing units 230a, 230b, 230c and 230d. A valve 254 makes it possible to regulate the flow of the water, and a valve 255 makes it possible to regulate the flow of steam, air or other gas to the rinsing units 230a, 230b, 230c and 230d to an appropriate rate. The countercurrent flow path of the rinse solution through the rinser stage 220 is from the pipe 252 to the rinsing unit 230a, through the conveyor 221 and the flatwork 19 carried thereby to the vessel 240a, to the rinsing units 230b via a pipe 256a and the force pump 250a, again through the conveyor 221 and the work 19 to the vessel 240b, thence to the rinsing units 230c via a pipe 256b and the force pump 250b, once again through conveyor 221 and the work 19 to the vessel 240c, finally to the rinsing unit 230d via a pipe 256c and the force pump 250c, again through the conveyor 221 and the work 19 to the vessel 240d, and finally to the compartment 3 of the tank 2 via the tip 251 and the force pump 250d. It is, of course, to the understood that the pumps may be of conventional structure and may be driven in any suitable way.

The rinser conveyor 221 is made up of upper and lower, open mesh, endless belts 222 and 223 and is inclined upward and to the right as viewed in FIGS. 1 and 2 at an angle of about 10°. The upper belt 222, disposed for rotation in the counterclockwise direction on driven rollers 224a and 224b, has a lower flight in contiguous relation with the upper flight of the lower belt 223, thereby forming a laminar portion 221a of the rinser conveyor 221 for sandwiching the flatwork 19 interjacently during its trip through the rinser stage 220. The lower belt 223, disposed for rotation in the clockwise direction on a driven roller 224c and idler rollers 224d and 224e, has an upper flight supported along its midsection by the upper surfaces of the closelyspaced vessels 240a, 204b, 240c and 240d.

At the receiving end of the conveyor 221, the lower belt 223 extends somewhat beyond the upper belt 222, and a portion of its upper flight is supported on the idler roller 224e in contiguous relation with the surface of the detergent-wringer drum 191 in order to receive work entering the rinser stage 220. At the discharge end of the conveyor 221, the upper belt 222 diverges from the lower belt 223 and loops around the driven roller 224d for its return flight to the roller 224a and the receiving end of the conveyor. From the point of divergence, the work 19 travels a short distance on the lower belt 223 before entering the rinse wringer stage 260.

To feed the work from the rinser stage 220 into the rinse wringer stage 260, an endless guide belt 227 is disposed on rollers 228 and 229, and in contiguity with the lower arc of the loop formed around the driven rollers 224c by the belt 223. Hence, the work 19 carried from the point of divergence on the upper surface of the lower belt 223 becomes sandwiched between the guide belt 227 and the lower belt 223, and is carried in this position until it is deposited automatically on the surface of the rinsewringer carried drum 261. The rollers 224a, 224b, 224c, 224d, 224e, 228 and 229 are mounted rotatably on shafts 226.

After the detergent-bleach solution has been removed in the rinser stage 220, the work 19 automatically passes through the rinse wringer stage 260 where a large percentage of the rinse solution is expressed in the manner described above, and then the work 19 passes to the dryer stage 275.

The dryer

The dryer stage 275 evaporates most of the rinse solution remaining in the work after it has passed through the rinse wringer stage 260, and leaves it with a moisture content appropriate for ironing. Alternatively, the dryer stage 275 may be adjusted to dry the work to the extent necessary to make it ready for immediate use.

As represented best in FIGS. 1 and 2, the dryer stage 275 comprises the endless belt conveyor 276 having a horizontal upper flight 276a disposed above a series of heat producing elements. The conveyor belt 276, made of wire mesh, has a receiving end looped around an idler roller 278a disposed beneath the carrier drum 261 of the rinse wringer stage 260, and a discharge end looped around an idler roller 278c (FIG. 1) disposed at the end of a vertical flight 276b. The upper horizontal flight 276a of the conveyor bends downwardly around a drive roller 278b where it merges into the vertical flight 276b. The return flight 276c of the conveyor loops around an idler roller 278d.

To hold the work securely in place while being carried down the vertical flight 276b, and to provide a horizontal discharge flight for the work 19, the endless guide belt 280 is supported on the drive roller 281a, an idler roller 281b, an idler roller 283, and the idler roller 278c so that one of its flights is in laminar relation with the vertical flight 276b of the dryer conveyor. Hence, the work 19 is enveloped between the contiguous surfaces of the belts 276 and 280 while it is transported down the vertical flight 276b. Guide rollers 279a and 279b are disposed on opposite sides of the vertical flight 276b so that the belts 276 and 280 are pressed together tightly against the work 19. This minimizes the possibility that the work 19 will slide out of position as it is carried down the vertical flight 276b. At the idler roller 278c, the belt 276 diverges from the belt 280, and the latter continues for a short horizontal discharge flight 280a to the idler roller 281c. The return flight 280b is carried around the idler roller 281b, and thence to the drive roller 281a where it reconverges against the belt 276.

In the embodiment shown in FIG. 1, gas is supplied from a source (not shown) to a plurality of gas burners 277. The burners 277 are elongated so that they extend transversely across the entire width of the dryer conveyor 276, and it will be understood that, while only six burners are shown in FIG. 1, the illustration in that regard is merely schematic, since many more burners would normally be employed. The upper horizontal flight 276a is disposed so that it carries the work through flames 277a emanating from the burners. The moisture content of the work and the comparatively high speed of the conveyor 276 prevents the work from being burned or scorched. Another preferred, and novel, combination of drying means, however, is shown in FIG. 2. There, a plurality of gas-fired infrared burners 277b, of known commercial construction and schematically illustrated in FIG. 2, are spaced apart beneath and transverse with respect to the dryer conveyor 276, with gas being fed to the burners through ordinary gas pipes, not shown. Between each of the infrared units 277b, there are disposed a plurality of hot-air manifolds 285 which extend transversely beneath the entire width of the conveyor 276. Each manifold 285 is provided along its top with an elongated, restricted, air discharge nozzle 285a which likewise extends transversely beneath the entire width of the conveyor 276. Heated air, at about 150° F., is fed under pressure to the manifolds 285 by conventional pipes (not shown), and the heated air is thus discharged upwardly through the conveyor 276 and through the flatwork 19 carried thereby. This heater and air discharge arrangement shown in FIG. 2 is, of course, shown schematically, and it will be understood that more heaters 277b and air manifolds 285 may be employed than are illustrated therein. The combination heater and air discharge arrangement, however, represents an important discovery in the art of continuous drying, for it has been found that the rate at which drying can be accomplished with this arrangement is substantially greater than with the use of merely conventional flame drying and the like. Why this is so is not yet fully known, but it is believed that the heaters 277b cause the moisture in the flatwork to flash to steam, whereupon the succeeding air blasts of hot air immediately drive the steam out of the fabric before the steam begins to condense.

Further details of the construction and operation of the several parts of the apparatus are set forth in the aforementioned co-pending application Serial No. 499,137, and the disclosure thereof is incorporated herein by reference for further amplification of the construction and operation of the apparatus.

Operation

From the pressure roller 263, the flatwork 19 drops to the horizontal belt 276 of the dryer stage 275 which carries it through a succession of flames 277a from the gas burners 277, if the dryer mechanism of FIG. 1 is employed. Alternately, if the dryer embodiment of FIG. 16 is used, the flatwork is carried successively over the infra-red heaters 277b and the intervening knife-like hot air blasts or jets produced by the manifolds 285 and their nozzles 285a, whereby the moisture in the flatwork is subjected repeatedly, it is believed, to a flashing of its moisture to steam and an immediate blowing away of the steam by the hot air blasts. After traveling through the last flame or over the last heater of the series, the flatwork 19 becomes interleaved between the conveyor belt 276 and the conveyor belt 280 for a short downward flight 276b to the horizontal discharge flight 280a, from which the work, now clean and dry, may be taken for use, or further processing as required.

The representations in the text and drawings have been intended merely to facilitate the practice of this invention by persons skilled in the art and no unnecessary limitations are intended thereby, for the scope of the invention is delimited in the following claims.

1. A method of continuously drying fabric articles having rinse fluid therein comprising the steps of: transporting the articles along a predetermined path, subjecting the articles to a gas-fired infrared burner during transportation thereof along said predetermined path, and subjecting the articles to a blast of hot air directed onto the articles during transportation thereof along said predetermined path at a point immediately adjacent to said burner on the side thereof in the direction of travel of the articles along said predetermined path, thereby to evaporate at least a portion of the rinse fluid from the articles to dry the articles.

2. The method set forth in claim 1, wherein the hot air has a temperature of about 150° F.

3. The method set forth in claim 1, wherein said predetermined path is essentially horizontal and said burner is disposed therebelow and directed upwardly onto the articles transported therealong and said blast of hot air is directed upwardly onto the articles transported therealong.

4. A method of continuously drying fabric articles having rinse fluid therein comprising the steps of: transporting the articles along a predetermined path, subjecting the articles to a plurality of spaced-apart gas-fired infrared burners during transportation thereof along said predetermined path, and subjecting the articles to a plurality of successive blasts of hot air corresponding in number to said burners and respectively directed toward said predetermined path at positions adjacent to the corresponding burner in the direction of travel of the articles, thereby to evaporate at least a portion of the rinse fluid from the articles to dry the articles.

5. The method set forth in claim 4, wherein the hot air has a temperature of 150° F.

6. The method set forth in claim 4, wherein said predetermined path is essentially horizontal and said burners are disposed therebelow and said blasts of hot air are directed from below and upwardly thereacross.

7. The method of drying wet fabric articles, comprising the steps of passing said articles successively along a predetermined path, and subjecting each article successively to radiant heat from a gas-infrared burner and blasts of warm air while maintaining movement of the article along said path.

8. A high-speed continuous apparatus for drying fabric articles having rinse solution therein comprising: a gas-fired infrared burner, a conveyor for transporting the articles along a predetermined path adjacent to said burner, and an air discharge nozzle disposed adjacent to said conveyor and immediately adjacent to said burner on the side thereof in the direction of travel of the articles, said nozzle directing a stream of heated air on the articles transported along said predetermined path by said conveyor to carry away rinse fluid vapors formed by exposure of the articles to said burner, thereby to evaporate at least a portion of the rinse fluid from the articles to dry the articles.

9. The apparatus set forth in claim 8, wherein said blast of hot air has a temperature of 150° F.

10. The apparatus set forth in claim 8, wherein said burner and said air discharge nozzle are both located on the same side of said conveyor.

11. The apparatus set forth in claim 8, wherein said burner and said discharge nozzle are both disposed below said conveyor.

12. A high-speed continuous apparatus for drying fabric articles having rinse solution therein comprising: a plurality of spaced-apart gas-fired infrared burners arranged in general alignment, a conveyor for transporting the aticles along a predetermined path adjacent to said burners, and a plurality of air discharge nozzles corresponding in number to said burners and each disposed adjacent to said conveyor and immediately adjacent to the associated burner on the side thereof in the direction of travel of the articles, said air discharge nozzles each directing a stream of heated air onto the articles transported along said predetermined path by said conveyor to carry away rinse fluid vapors formed by exposure of the articles to the associated (source of radiant heat) burner, thereby to evaporate at least a portion of the rinse solution from the articles to dry the articles.

13. The apparatus set forth in claim 12, wherein said burners and said air discharge nozzles are both located on the same side of said drying conveyor.

14. The apparatus set forth in claim 12, wherein said burners and said air discharge nozzles are both disposed below said drying conveyor.

15. The apparatus set forth in claim 12, wherein a plurality of air discharge nozzles is provided between each adjacent pair of the burners.

References Cited

UNITED STATES PATENTS

| | | | |
|---|---|---|---|
| 1,766,595 | 6/1930 | Back | 34—18 XR |
| 2,342,235 | 2/1944 | Adair et al. | 68—20 XR |
| 2,440,648 | 4/1948 | Walter et al. | 34—68 XR |
| 3,292,397 | 12/1966 | Wooliever | 68—19 |

KENNETH W. SPRAGUE, Primary Examiner

U.S. Cl. X.R.

34—68